United States Patent [19]

Sprague et al.

[11] Patent Number: 4,795,349

[45] Date of Patent: Jan. 3, 1989

[54] CODED FONT KEYBOARD APPARATUS

[76] Inventors: Robert Sprague; Joan Sprague, both of 448 La Prenda, Los Altos, Calif. 94022

[21] Appl. No.: 25,968

[22] Filed: Mar. 16, 1987

Related U.S. Application Data

[63] Continuation-in-part of Ser. No. 664,227, Oct. 24, 1984, Pat. No. 4,650,423, and Ser. No. 923,422, Oct. 27, 1986.

[51] Int. Cl.⁴ .............................................. G09B 19/00
[52] U.S. Cl. ..................................... 434/156; 283/46; 400/485; 434/185
[58] Field of Search ............... 400/485, 486; 434/156, 434/185; 283/1 A, 46

[56] References Cited

U.S. PATENT DOCUMENTS

| 1,590,998 | 6/1926 | Balston | 400/99 |
| 4,180,337 | 12/1979 | Otey | 400/486 |
| 4,650,423 | 3/1987 | Sprague et al. | 434/156 |

FOREIGN PATENT DOCUMENTS 651504 9/1985 Switzerland ..................... 400/485

Primary Examiner—Paul T. Sewell
Attorney, Agent, or Firm—Limbach, Limbach & Sutton

[57] ABSTRACT

A coded font keyboard design is presented wherein conventional keyboard formats, such as the qwerty keyboard, are coded to produce instructional materials for developmental language education using the periodic code of language elements. A preferred embodiment describes the use of the qwerty keyboard to product all coded symbols used in the periodic table of language elements.

2 Claims, 11 Drawing Sheets

FIG_2

| | | | | | |
|---|---|---|---|---|---|
| R1 | | | | | |
| R2 | FIG.1 | | FIG.2 | | FIG.3 |
| R3 | | | | | |
| R4 | | | | | |
| R5 | FIG.4 | | FIG.5 | | FIG.6 |
| R6 | | | | | |
| R7 | | | | | |
| R8 | FIG.7 | | FIG.8 | | FIG.9 |
| R9 | | | | | |
| | COL1 | COL2 | COL3 | COL4 | COL5 |

THE PERIODIC TABLE OF LANGUAGE ELEMENTS

FIG.10.

CODED FONT KEYBOARD APPARATUS

DESCRIPTION

RELATED APPLICATION DATA

This application is a continuation in part of our copending applications Ser. No. 664,227 filed on Oct. 24, 1984 and now U.S. Pat. No. 4,650,423 issued on Mar. 17, 1987, and Ser. No. 923,422, filed on Oct. 27, 1986.

TECHNICAL FIELD

This invention relates to typewriting and word processing keyboards. Specifically, this invention relates to a coded font keyboard design which enables the use of the common keyboard formats, such as the qwerty keyboard, to code language elements.

BACKGOUND OF THE INVENTION

In our earlier application, now U.S. Pat. No. 4,650,423, we disclosed apparatus and methods for use in developmental language education, to permit the teaching and transcription of language based upon a periodic code of language elements. One of the advantageous features of the periodic code of language elements was the use of existing symbols and letters to enable the use of existing and conventional word processing equipment and typewriters to create instructional materials for use with the periodic code of language elements. In particular, we made use of commas and other common typewriter marks to distinguish the various phonetic consequences of the language elements.

In developing and producing instructional materials to be used with the periodic code of language elements, we first conceived of an entirely novel keyboard and keyfont layout which divided the keyboard into vowel and consonant subgroups for easier pattern learning and for structured typing. It was also our intent to permit conventional typewriters to be used to code the various elements, including their tags and marks, on standard alphabet letters. However, it was almost immediately recognized that the use and development of a novel keyboard, dividing the keyboard into vowel and consonant subgroups, might meet with opposition by all those operators who are already expert in the popular qwerty keyboard, as well as other conventional keyboard layouts. Although electronic keyboards no longer need the qwerty key positions once necessary in mechanical typewriters, the pattern persists due to establishment inertia. It was our belief that the periodic code keyboard which we developed might take a very long time to be established and used widely because of this establishment inertia. As a result, we decided that the conventional keyboards should be used as the basis for coding the language element described in our previous disclosure on the periodic code of language elements. We found that many of the older typewriting machines were useful to produce the coded language elements. However, some of the more popular microcomputer word processing equipment and software did not permit the super imposition of tags and marks on standard alphabet letters. Apparently, when this superimposition is attempted, the backspace function serves to erase the key which was first struck, thus prohibiting the superposition of the coding symbols. The fact that some of the more popular educational computer hardware and software did not permit this super positioning of coding upon initial language elements required that innovative action be taken to enable the widespread use of the periodic code of language elements in the educational system. Therefore, it is one object of the invention to use the conventional keypads for the basic, untagged key positions.

It is a further object of this invention to use an option key to produce the lowercase, tag symbols.

A still further object of this invention to use a shift-option key to produce uppercase, tag symbols.

BRIEF DESCRIPTION OF THE FIGURES

FIG. 10 is a diagram showing how FIGS. 1 through 9 fit together to form the periodic table of language elements.

DETAILED DESCRIPTION OF THE INVENTION

Figure 1:
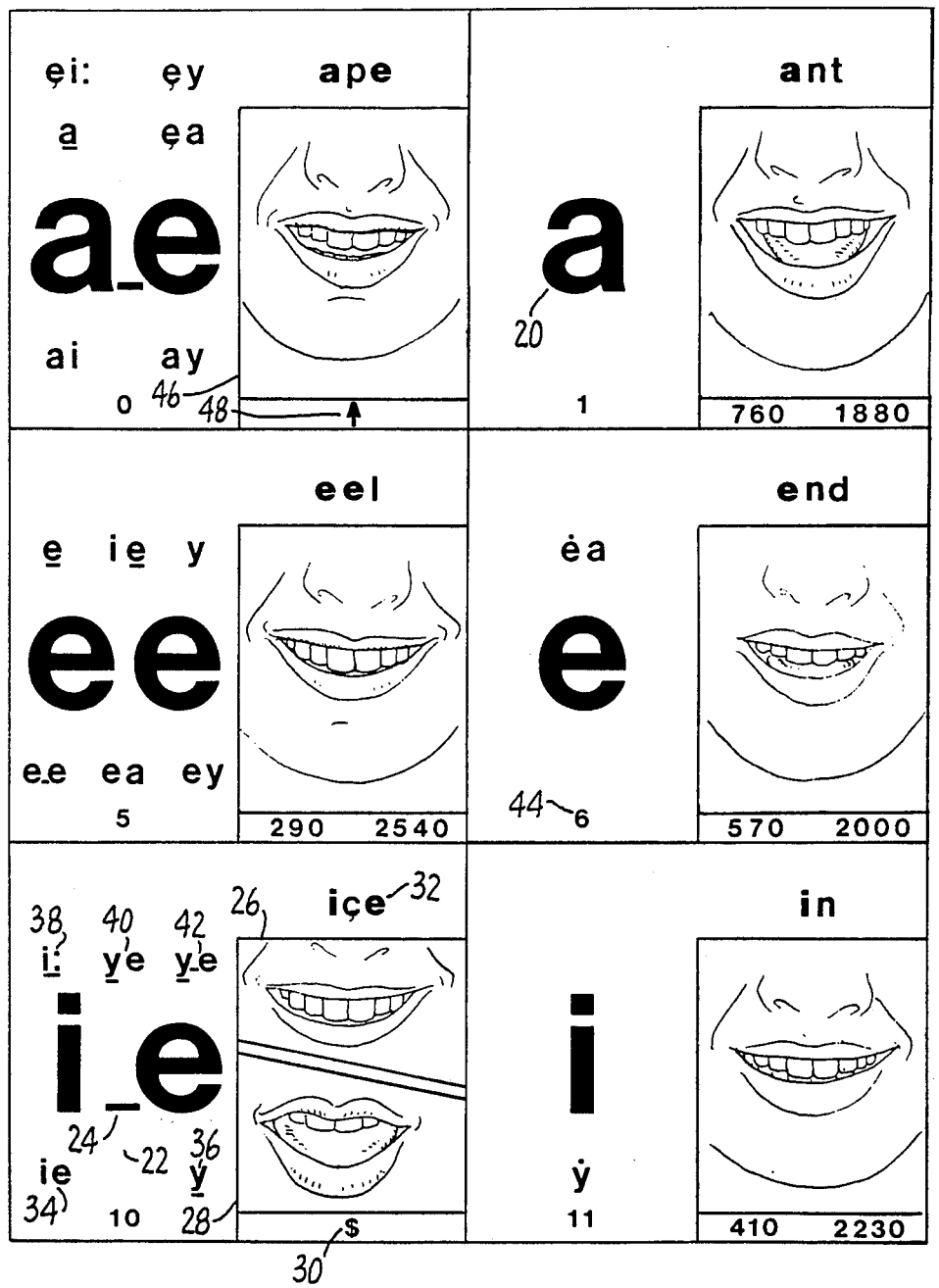
FIG. 1 shows the detail of the upper left hand corner of the periodic table of language elements.

We have previously described the use of a periodic table of language elements in developmental language education. In this periodic representation, which substantially maintains alphabetical ordering, we utilize conventional language elements, digraphs (a phonetic tool wherein two alphabet letters represent a single sound) and coded language elements, in conjunction with pictorial representations of the tongue and mouth positions, to help the student to establish a correlation between sounds and their corresponding symbols. The periodicity resulting from the column and row presentation of these language elements helps to demonstrate the relationships between various vowel and consonant sounds, particularly revealing progressions of mouth and tongue positions. In addition to the periodic table, we have also previously described the use of consonant and vowel phonomats which are used to perfect the developmental language student's understanding of the lip/tongue positioning necessary to produce the sounds.

One parameter for the design and implementation of our periodic representation of language elements was to utilize symbols and codes, in conjunction with standard alphabet elements, which were pre-existing and familiar. The use of commas, baseline splitters and other common typewriter marks, superimposed onto conventional letters would thereby serve two purposes. The first was the ability to use existing typewriters and word processing equipment to code our language elements during the preparation of instructional materials. This capability was intended to permit more widespread use of our developmental program since it would not be necessary to have access to specialized equipment. The other purpose served by the use of common place punctuation symbols, superimposed upon conventional alphabetic symbols, was to facilitate the developmental language student's progression from the "coded symbols" to uncoded reading and writing. This transitional ability was viewed as a significant advantage over prior art developmental language techniques which utilize specialized symbols thus requiring a second learning period to relate the developmental language symbols to conventional symbols.

According to the present invention, the popular qwerty keyboard design is maintained while introducing the specialized coded language elements used in our periodic table of language elements. A coded font keyboard uses the desired basic language element and either the shift, option or shift and option keys simultaneously, to generate the coded symbol. This relationship between the keyboard and the desired symbol is independent of the type of keyboard used. The method is also typeface independent. It is the intention of this invention to permit the use of a keyboard with familiar keys to be used to generate the unfamiliar symbols used in our periodic code of language elements.

In the development of this coded font keyboard design, we worked with an Apple Macintosh which does not use ASCII numbers in setting character sets. It was our aim to reduce the total number of keystrokes necessary to code instructional materials using our periodic language elements. We used a bit map font editor to develop the coding to tie the desired symbols to the keys available on common keyboards. In particular, we used the FONTASTIC software available from Altsys Corp. of Texas. Other software is commercially available to accomplish the same task. With the aid of the FONTASTIC software, we were able to code the keyboard as shown in the preferred embodiment of FIG. 2. Another software available from Altsys Corp. is FONTOGRAPHER which also is useful in mapping the keys to desired symbols. It is of note that this method of relating the symbols to the existing keyboard design permits the printing of the symbols in the patterns available on the hardware. For example, the Apple Macintosh permits the printer to print bold, italic, shadow or outline. The use of the bit map editor to develop coded keyboard-font relationships enables the same typefaces to be used to print the developmental language symbols.

To refer to the relationship between the keyboard and the coded elements, we refer to the coded elements as a character set. Once a bit map has been used to develop the relationship between the keyboard and the desired characters, we use the terminology "access to the alternate character set" to refer to the executable software and hardware necessary to achieve this result.

Referring now to FIG. 1, the coding used in the developmental program is shown. In the lower left section of each language element block, is a number from 0 to 44. This number will be used herein to refer to a block containing a language element. Block 15 is the language element le. Alternate spelling bets for this element are shown above the main symbol, in this case, al, el, and il. Block 16 contains the element al and related spellings a, au: and ou: Also note the element in block 28 și; block 33, țh and block 42, x. The use of commas, baseline splitters and other common typewriter marks represents the codes used in this developmental language program.

Figure 2:
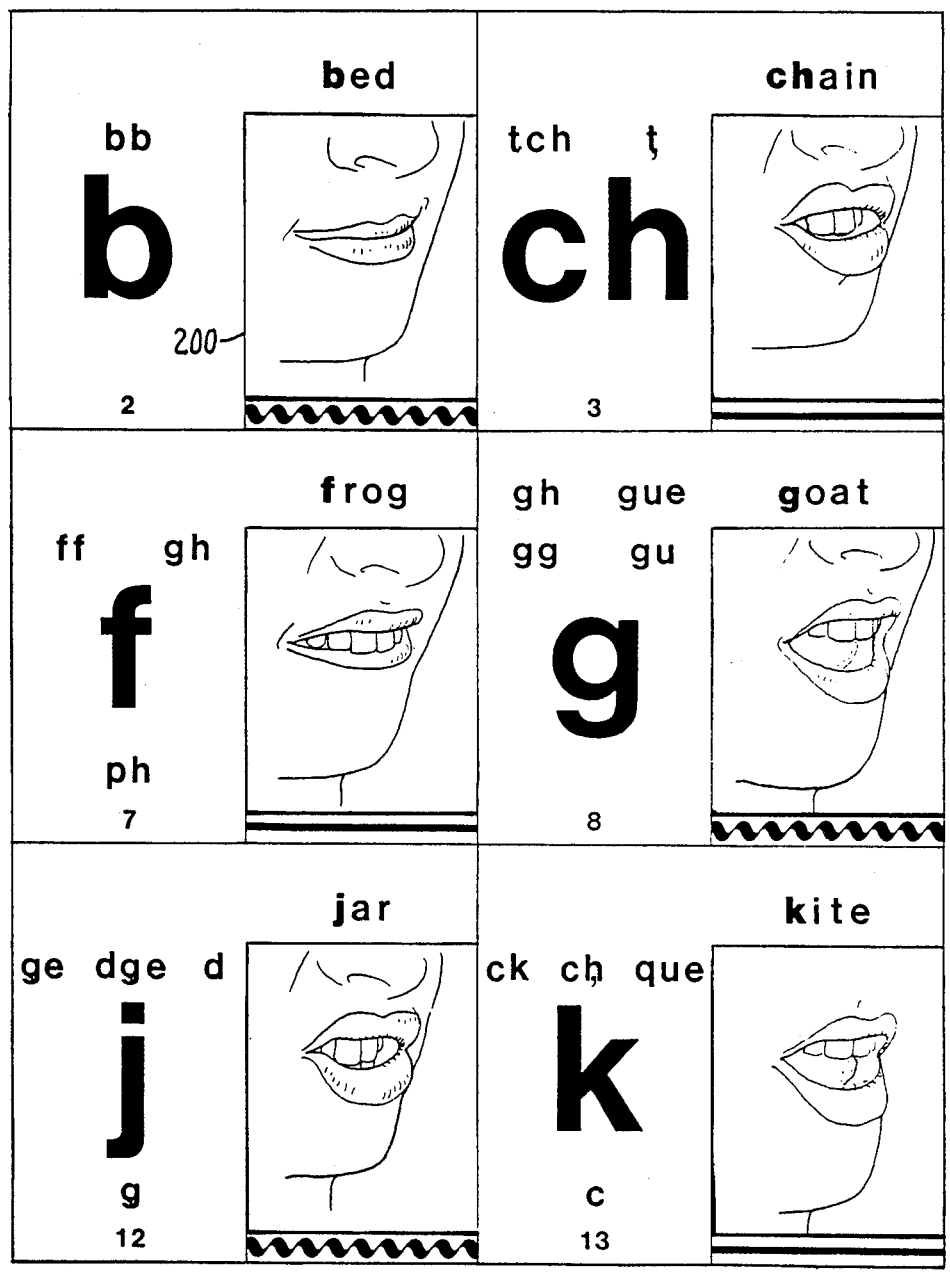
FIG. 2 shows the detail of the upper middle section of the periodic table of language elements.
Figure 3:
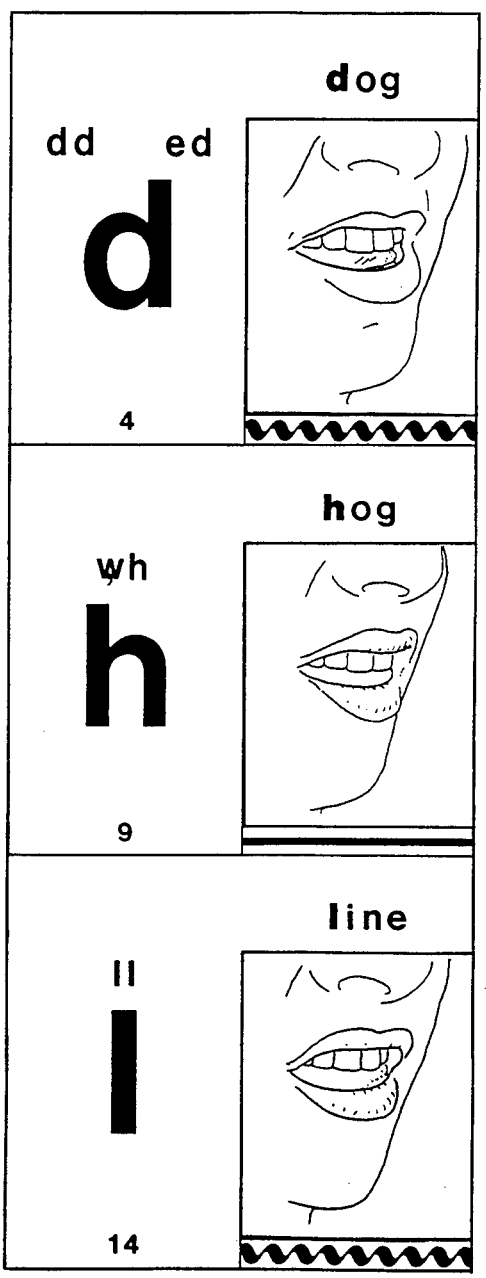
FIG. 3 shows the detail of the upper-right corner of the periodic table of language elements.
Figure 4:
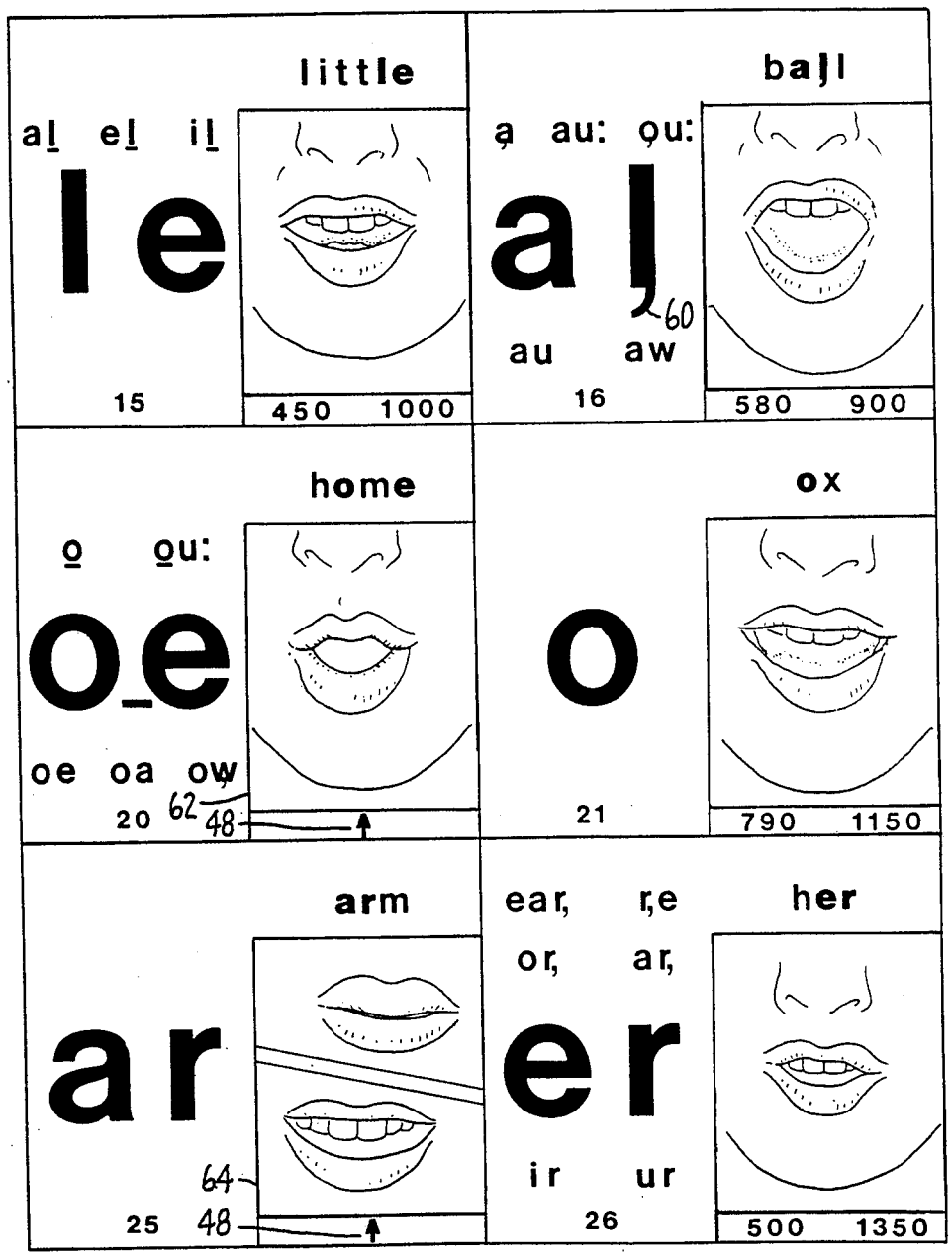
FIG. 4 shows the detail of the middle left section of the periodic table of language elements.
Figure 5:
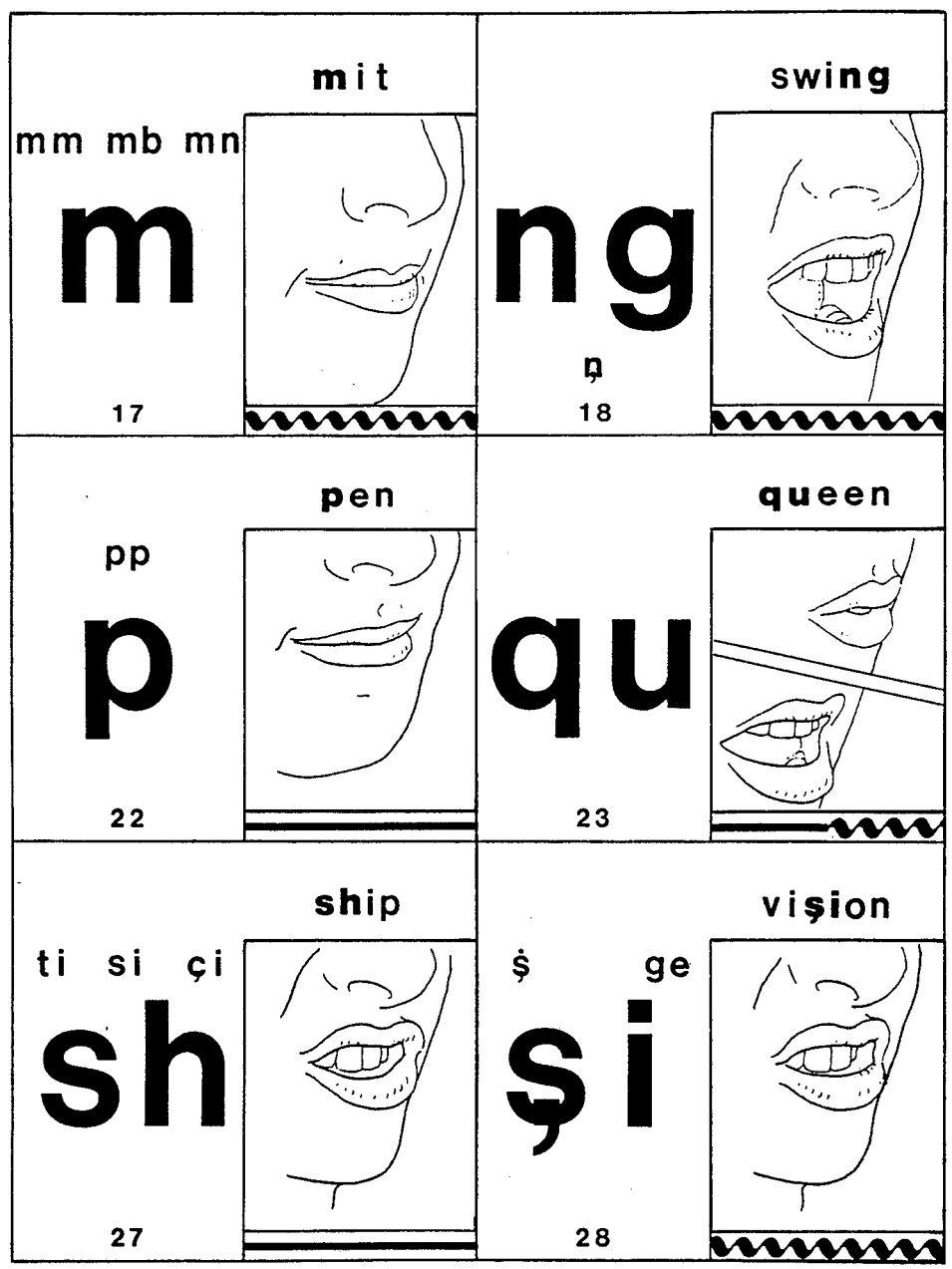
FIG. 5 shows the detail of the middle section of the periodic table of language elements.
Figure 6:
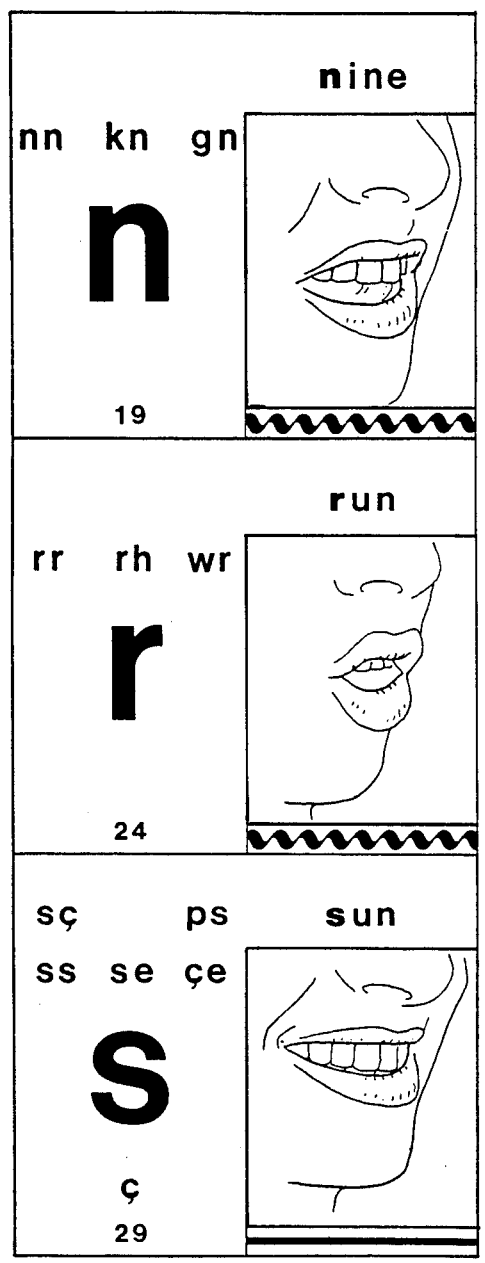
FIG. 6 shows the detail of the middle right section of the periodic table of language elements.
Figure 7:
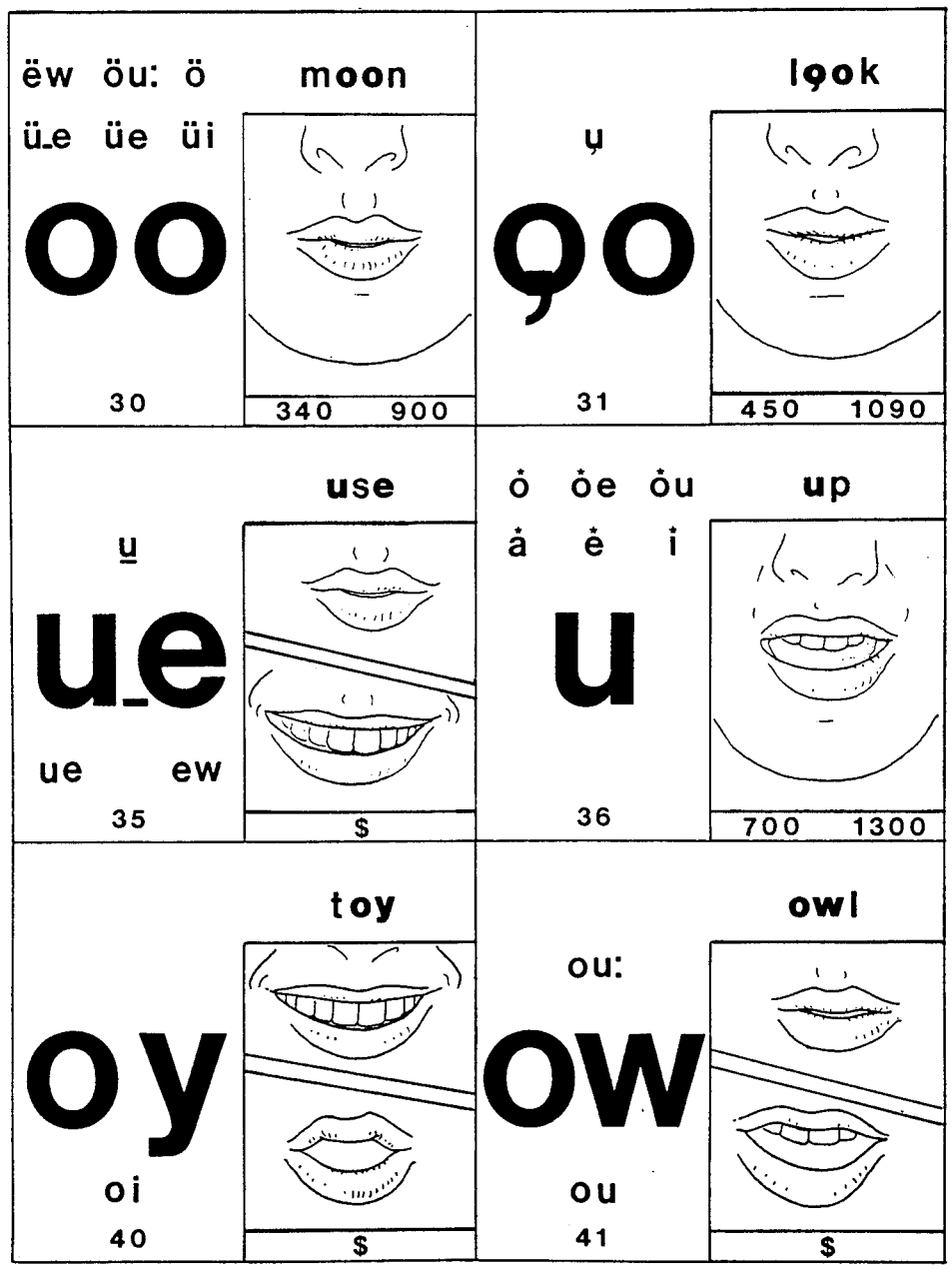
FIG. 7 shows the detail of the lower left corner of the periodic table of language elements.
Figure 8:
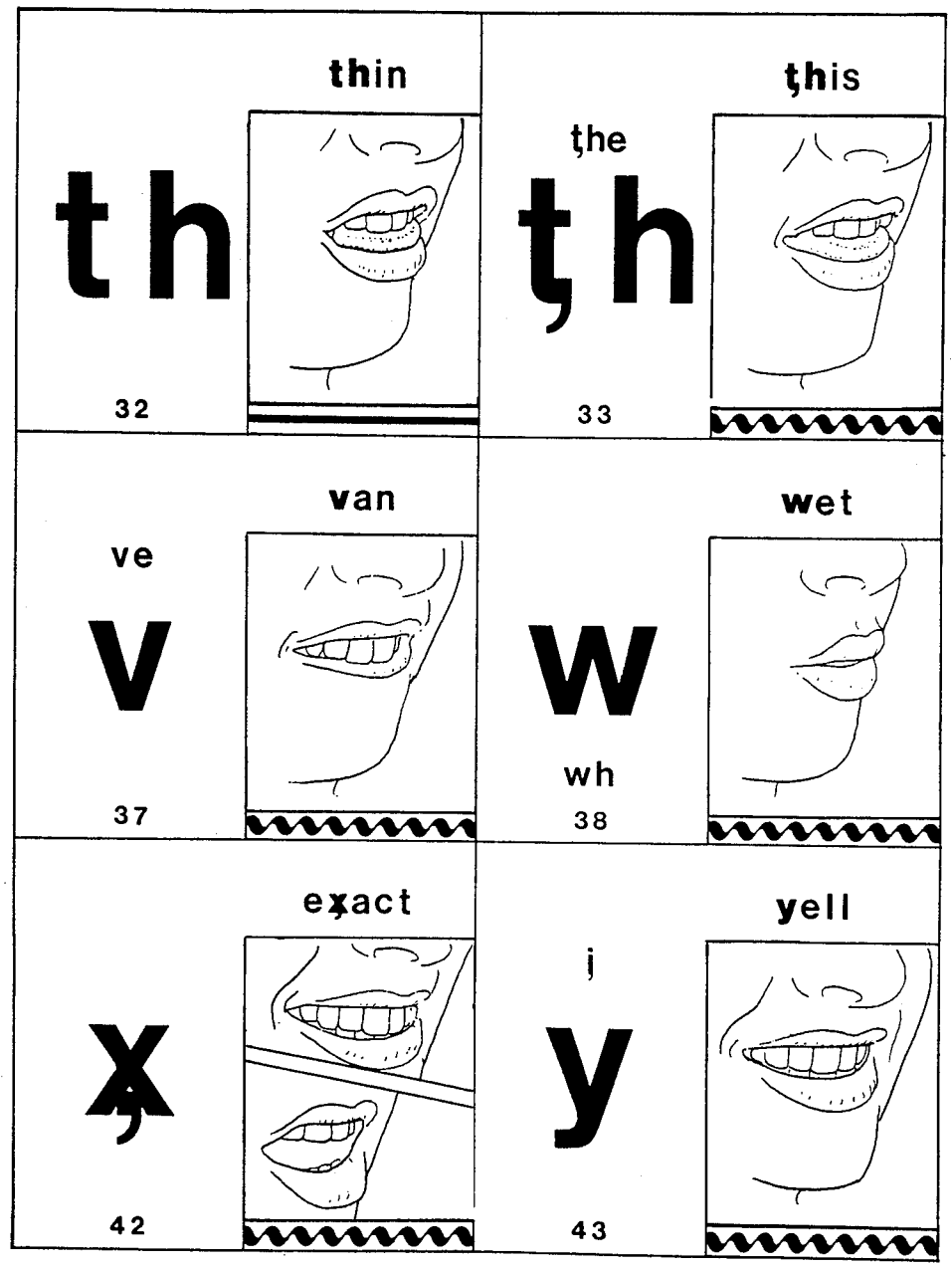
FIG. 8 shows the detail of the lower middle section of the periodic table of language elements.
Figure 9:
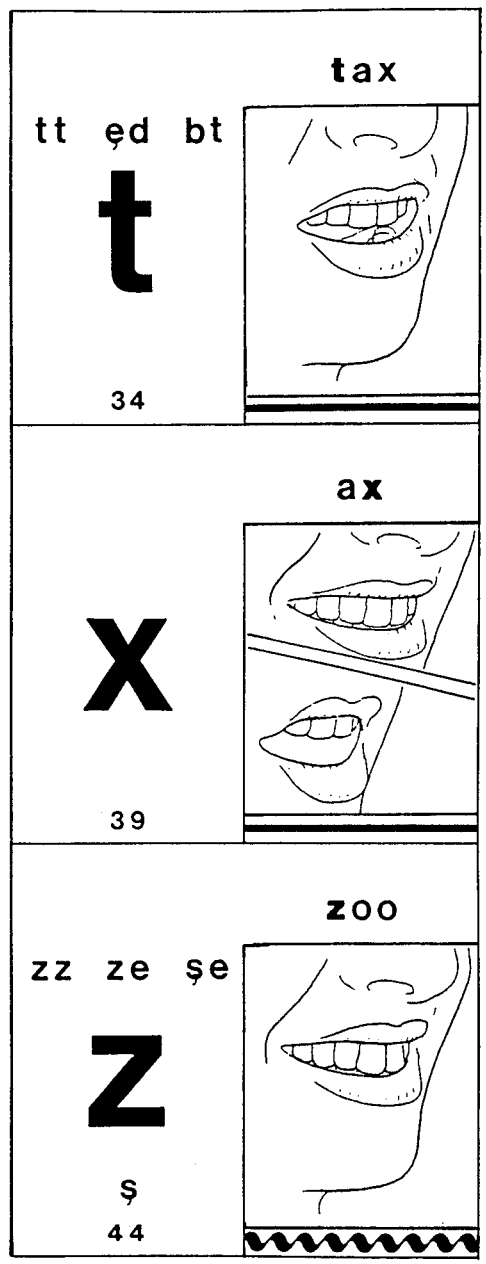
FIG. 9 shows the detail of the lower right corner of the periodic table of language elements.
Figure 11:
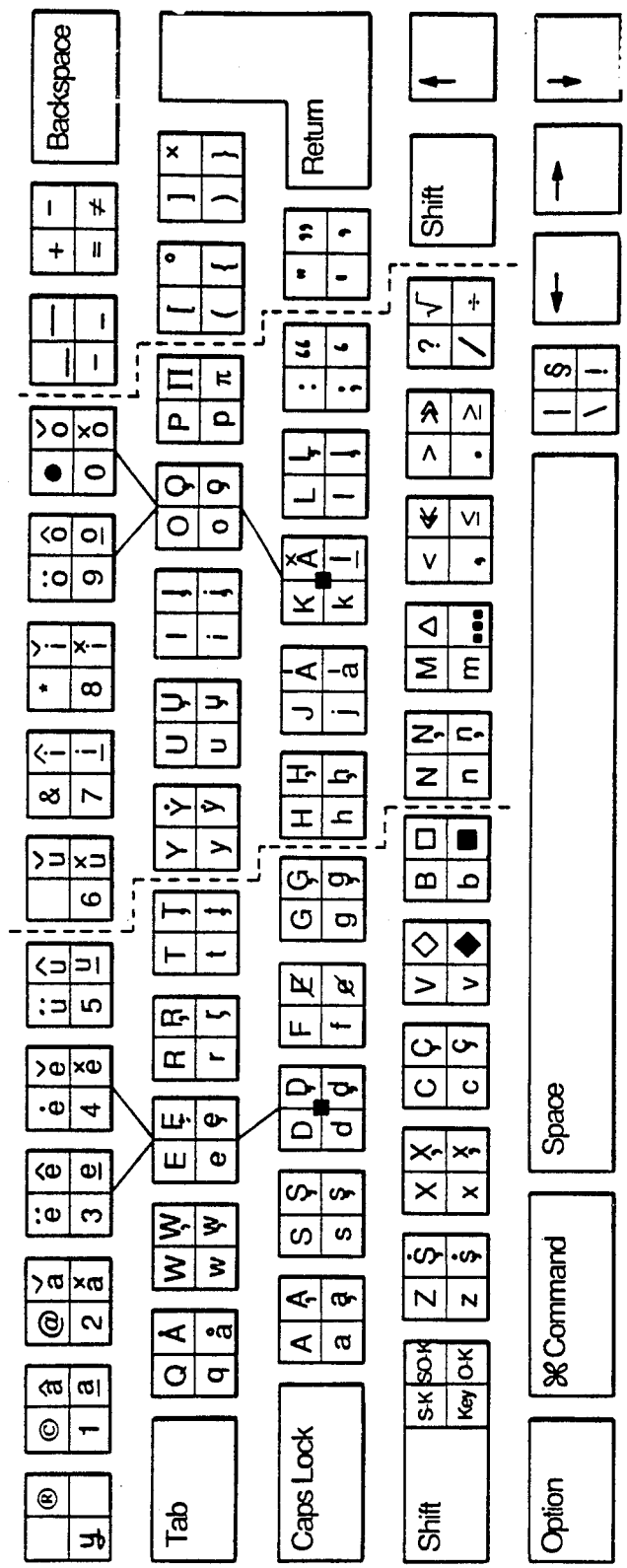
FIG. 11 is a plan view of a keyboard according to the preferred embodiment of the invention.

With this understanding of coding, and in view of the fact that superimposition may not be possible on the Apple Macintosh ®, one of the most popular educational computers, the instant invention was developed to permit the use of qwerty type keyboards to code language elements according to our earlier invention. As shown in FIG. 2, the positioning of the keys on the keyboard is maintained as in the qwerty format. However, each of the keys is intended to permit the coding of four separate elements. The qwerty key pattern is used for the basic, untagged key positions. An option key is used to produce lower case, comma tagged symbols. A shift key is used for upper case, comma tagged symbols. The odd number keys in the top row are used with the option key to produce bar-vowel lower case symbols. The even number keys are used with the option keys to produce the star-vowel lower case symbols. The use of the odd numbered keys with both shift and option (S-O) keys produces the flexer vowel symbols. The use of the shift and option (S-O) keys with the even number keys produces flexel-vowel symbols. On some of the odd-number keys, the shift key is used to produce vowel double dot symbols.

The new keyfont design produces symbol bets needed to augment the code matrix with flexers and flexels which are modified combinations of first column vowels and r and l respectively. For example, flexer a e, is âre or â which is pronounced "air" as in hare. Flexel a__e is ăle or ă which is pronounced "ail" as in bale. All common long splitter vowels form flexers and flexels and are included in this keyfont design. In addition, there are pseudo-flexers and pseudo-flexels which need to be distinguished from real flexers and flexels. Take the verb are, for example, it is pronounced like bet vowel ar. Option-f key is used to slash the ȩ and thus verb are may be written as are for unambiguous decoding.

There are also some auxiliary option and shiftoption keys at q and j that provide å, Å and ḍ,Ạ which may be used to take words like fåther, wåsh and cabbage, garbḍge out of the stop word categories by symbol coding. The designated symbols are easy to remember since å would be caution for o and ḍ would be caution for i. We are also now using the lower case basic bet symbols superpositioned above the alternate bet symbol to represent the desired sound bet.

This coded font keyboard design has been used successfully to reproduce a seventy page word list and three hundred fifty pages of teacher instructions using the coded symbols with our proprietary software design for the Macintosh Plus. A printed pattern for the new keyboard is fastened to an easel and positioned between the Mac keyboard and the monitor screen. The three persons who have used this new font key pattern have adjusted to the new pattern in less than one day and admitted that the job of decoding on the Macintosh Plus could not be done without it.

What is claimed is:

1. The combination of a keyboard for use with microcomputer word processing equipment, having its keys arranged in qwerty format, with a chart displaying the periodic table of language elements in 9 rows and 5 columns as follows:

| a__e | a | b | ch | d |
|------|---|---|----|---|
| ee   | e | f | g  | h |
| i__e | i | j | k  | l |

| | | -continued | | |
|---|---|---|---|---|
| le | aj | m | ng | n |
| o_e | o | p | qu | r |
| ar | er | sh | ṣi | s |
| oo | ṗo | th | th | t |
| u_e | u | v | w | x |
| oy | ow | ẋ | y | z | and with an alternate language element character set operatively accessible through said qwerty format keyboard, for coding textual materials in the language elements displayed on the chart.

2. A method for coding instructional materials in a teaching language using microcomputer word processing equipment which comprises the steps of:

(a) providing a keyboard having keys arranged in qwerty format, a chart displaying a periodic table of language elements in 9 rows and 5 columns as follows:

| a_e | a | b | ch | d |
|---|---|---|---|---|
| ee | e | f | g | h |
| i_e | i | j | k | l |
| le | aj | m | ng | n |
| o_e | o | p | qu | r |
| ar | er | sh | ṣi | s |
| oo | ṗo | th | ṫh | t |
| u_e | u | v | w | x |
| oy | ow | ẋ | y | z | and an alternate language element character set which is operatively accessible through said qwerty format keyboard; and, (b) coding instructional materials in a teaching language by accessing the language element character set with the keys of said qwerty format keyboard to thereby provide textual materials coded in the language elements of the teaching language.

* * * * *